United States Patent
Peckham et al.

(10) Patent No.: US 7,216,161 B1
(45) Date of Patent: May 8, 2007

(54) MAINTAINING INTERNET ACCESS WHILE MOVING FROM PORT TO PORT

(75) Inventors: William Peckham, San Diego, CA (US); Dandi Lynde-Redman, San Deigo, CA (US)

(73) Assignee: Cisco Technology, Inc., San Jose, CA (US)

( * ) Notice: Subject to any disclaimer, the term of this patent is extended or adjusted under 35 U.S.C. 154(b) by 831 days.

(21) Appl. No.: 10/008,889

(22) Filed: Nov. 8, 2001

(51) Int. Cl.
*G06F 13/00* (2006.01)
(52) U.S. Cl. ...................................... 709/224
(58) Field of Classification Search ................ 709/228, 709/227, 217; 380/250; 370/230
See application file for complete search history.

(56) References Cited

U.S. PATENT DOCUMENTS

| | | | | |
|---|---|---|---|---|
| 5,751,967 A | * | 5/1998 | Raab et al. .................. 709/228 |
| 5,812,784 A | * | 9/1998 | Watson et al. ............... 709/227 |
| 5,867,662 A | | 2/1999 | Riggs ..................... 395/200.58 |
| 6,088,728 A | * | 7/2000 | Bellemore et al. ........... 709/227 |
| 6,226,678 B1 | * | 5/2001 | Mattaway et al. ........... 709/230 |
| 6,233,242 B1 | * | 5/2001 | Mayer et al. ................ 370/412 |
| 6,512,754 B2 | * | 1/2003 | Feder et al. ................. 370/338 |
| 6,766,373 B1 | * | 7/2004 | Beadle et al. ............... 709/227 |
| 6,816,455 B2 | * | 11/2004 | Goldberg et al. ........... 370/230 |
| 2001/0009014 A1 | * | 7/2001 | Savage et al. .............. 709/204 |
| 2002/0095486 A1 | * | 7/2002 | Bahl .......................... 709/223 |
| 2003/0097449 A1 | * | 5/2003 | Derocher et al. ........... 709/227 |
| 2003/0222819 A1 | * | 12/2003 | Karr et al. ................... 342/457 |

* cited by examiner

*Primary Examiner*—Robert B. Harrell
(74) *Attorney, Agent, or Firm*—Thelen Reid Brown Raysman & Steiner LLP; David B. Ritchie (57) ABSTRACT

An algorithm and a device manage a feature that allows a user to maintain an active session when moving from port to port. The device comprises a first memory, a second memory, and a verifier. The first memory stores a list of ports. The second memory stores a list of active sessions. Each active session identifies a port on which a user is connected. The verifier communicates with the first memory and the second memory and periodically checks each session in the list of active sessions. If a session is inactive, the verifier searches for the user on other ports. If verifier identifies the user on another port, the verifier updates the list of active sessions with the user identified on that other port.

32 Claims, 11 Drawing Sheets

MAINTAINING INTERNET ACCESS WHILE MOVING FROM PORT TO PORT

FIELD OF THE INVENTION

The present invention relates to computer software. More particularly, the present invention relates to server computer software for network applications.

BACKGROUND OF THE INVENTION

In a network setting, a user accesses other computer networks through various network components. In particular, mobile computer users may want to access the Internet from their room in a hotel, an office building, or an airport concourse. As part of a solution to provide users with broadband services, a Building Broadband Service Manager (BBSM) may be deployed in a building for plug-and-play access, authentication, and billing.

Such BBSM requires a user to authenticate when activating a session with the user computer connected to a port. The port may for example be an ethernet jack, a wireless access point, or a cable modem. In the case of a wireless access point, a user may activate a session with an access code policy using wireless LAN equipment—the wireless access point. The BBSM associates a port with the session. When the user moves from a first access point to a second access point, the link quality or the signal strength as seen by the first access point decreases as the user moves away from the first access point. The BBSM eventually deactivates the user's session as the end user disassociates from the access point. When the user moves closer to the second access point, the link quality as seen by the second access point increases, and the BBSM re-associates the end user with a new port. The user must re-authenticate to gain access to the Internet.

Figure 1:
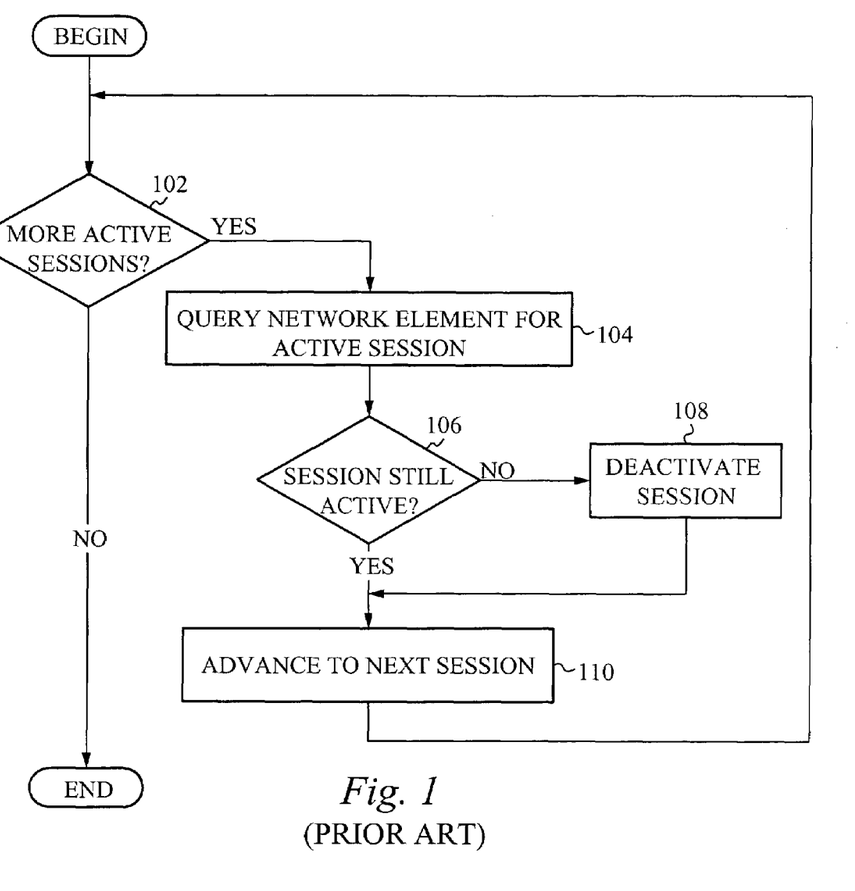
FIG. 1 is a flow diagram for a method for managing sessions in a Building Broadband Service Manager (BBSM) application software according to a prior art.

FIG. 1 illustrates a flow diagram of a software of a BBSM as described above. In block 102, the BBSM scans for active sessions. If the BBSM finds an active session, the BBSM queries the network element for that active session in block 104 and detects whether the session is still active in block 106. BBSM deactivates the session in block 108 if the network element does not find the user associated with the port. Otherwise, the BBSM advances to the next active session in block 110.

A need therefore exists for a method and device that seamlessly maintains the user's session as the user moves from one port to another and does not require the end user to re-authenticate. A primary purpose of the present invention is to solve these needs and provide further, related advantages.

BRIEF DESCRIPTION OF THE INVENTION

An algorithm and a device manage a feature that allows a user to maintain an active session when moving from port to port. The device comprises a first memory, a second memory, and a verifier. The first memory stores a list of ports. The second memory stores a list of active sessions. Each active session identifies a port on which a user is connected. The verifier communicates with the first memory and the second memory and periodically checks each session in the list of active sessions. If a session is inactive, the verifier searches for the user on other ports. If the verifier identifies the user on another port, the verifier updates the list of active sessions with the user identified on that other port.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of a port hopping. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

A port may be a jack into which a user connects a computer to gain Internet access. In the case of a wireless network element, such as an access point, a port is a virtual jack. A session is the set of interactions that a user has with a Building Broadband Service Manager (BBSM). An active session allows the user to access the Internet through the port. Port hopping as defined by the present invention allows a user to maintain the active session when moving from port to port.

When a user attempts to access other computer networks, such as the Internet, the BBSM to which the user is connected searches a configured list of network elements or network connectivity devices (e.g. Ethernet switches, wireless access points, etc. . . . ) to determine the port on which the user is associated. The BBSM then challenges the user to authenticate. If the user successfully authenticates, the BBSM activates a session assigned to that specific port. Periodically, the BBSM queries the assigned port to determine if the session is no longer active.

The present invention allows a session to remain temporarily active when a user is no longer associated with a port. If the user re-associates with the same port or a different port, the active session continues uninterrupted. If the user does not reappear on the network after a configurable delay, the session is deactivated.

Figure 2A:
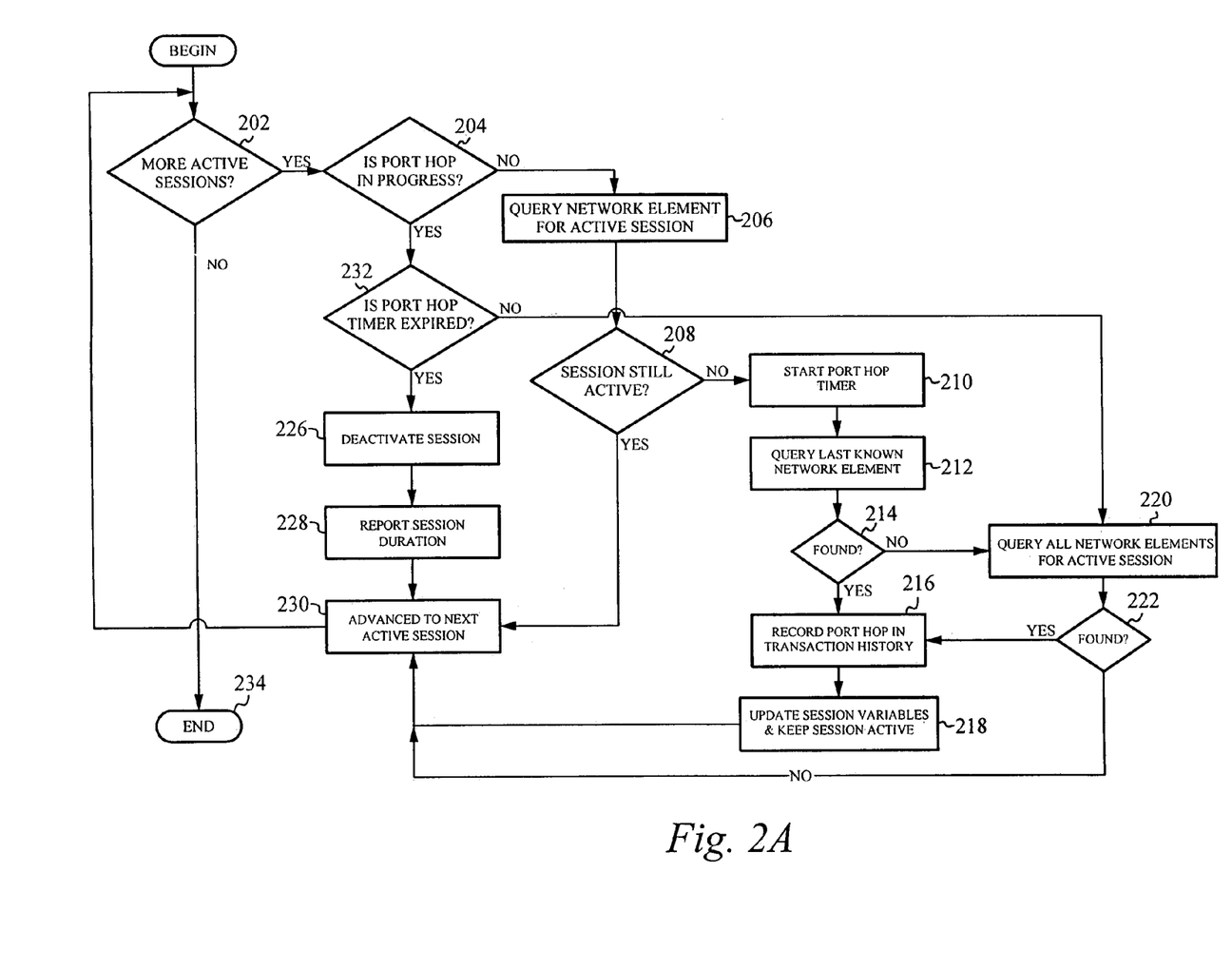
FIG. 2A is a flow diagram for a method for maintaining an active session for a user changing ports according to a specific embodiment of the present invention.

FIG. 2A illustrates a flow diagram for a method for maintaining an active session for a user changing ports according to a specific embodiment of the present invention. As previously described, the BBSM periodically scans for active sessions in block 202. If a session is found to be active the BBSM first queries whether a port hop is in progress in block 204. A port hop is in progress after the BBSM disassociates a session from one port and before the BBSM associates a session with a new port. When no port hop is in progress, the BBSM queries a network element associated with an active session in block 206.

In the decision block 208, the BBSM detects whether the session is still active—that is whether the user is still associated with the port listed in the session variables. If the session is still active, the BBSM advances to the next active session in block 230, otherwise the BBSM starts a port hop timer in block 210. The port hop timer is an adjustable delay timer that is discussed in more detail below. Once the timer is started, the BBSM queries the network element that was last connected with the user in block 212. If the user is found at the last connected network element in block 214, the BBSM records the port hop in a transaction history for the user in block 216. The session variables are then updated to reflect the port on which the user is located and the session is kept active in block 218. If the user is not found at the last connected network element in block 214, the BBSM queries all network elements for the active session in block 220. A user is identified on a port with its MAC address. Because each Media Access Control (MAC) address is unique, the BBSM is able to identify any user.

If the user is not found at another port in block 222, the BBSM advances to the next active session in block 230 in the case where there may be some time delay between disassociating from the source port and re-associating with the destination port. The BBSM periodically searches for the user until the port hop timer expires at block 232. If, after repeatedly searching for the user until the port hop timer expires, the BBSM still has not detected the user, then the BBSM deactivates the session in the transition from block 232 to block 226. After the BBSM reports the session duration in block 228, the BBSM advances to the next active session in block 230 and loops back to the decision block 202. In the case that the user does not appear on any network element after the expiration of the port hop timer, the session duration may not include time spent searching for the user.

If the user is identified on another port in block 222, the BBSM then records the port hop in a transaction history in block 216.

If a port hop is in progress in block 204, the BBSM then queries whether the port hop timer started in block 210 has expired in block 232. If the port hop timer has not expired, the BBSM proceeds to query all network elements for the active session in block 220. Otherwise, the BBSM proceeds with deactivating the session in block 226, since the user has vanished from all ports for the duration of the port hop timer. When no more sessions are found active, the BBSM ends its periodic query in block 234.

Figure 2B:
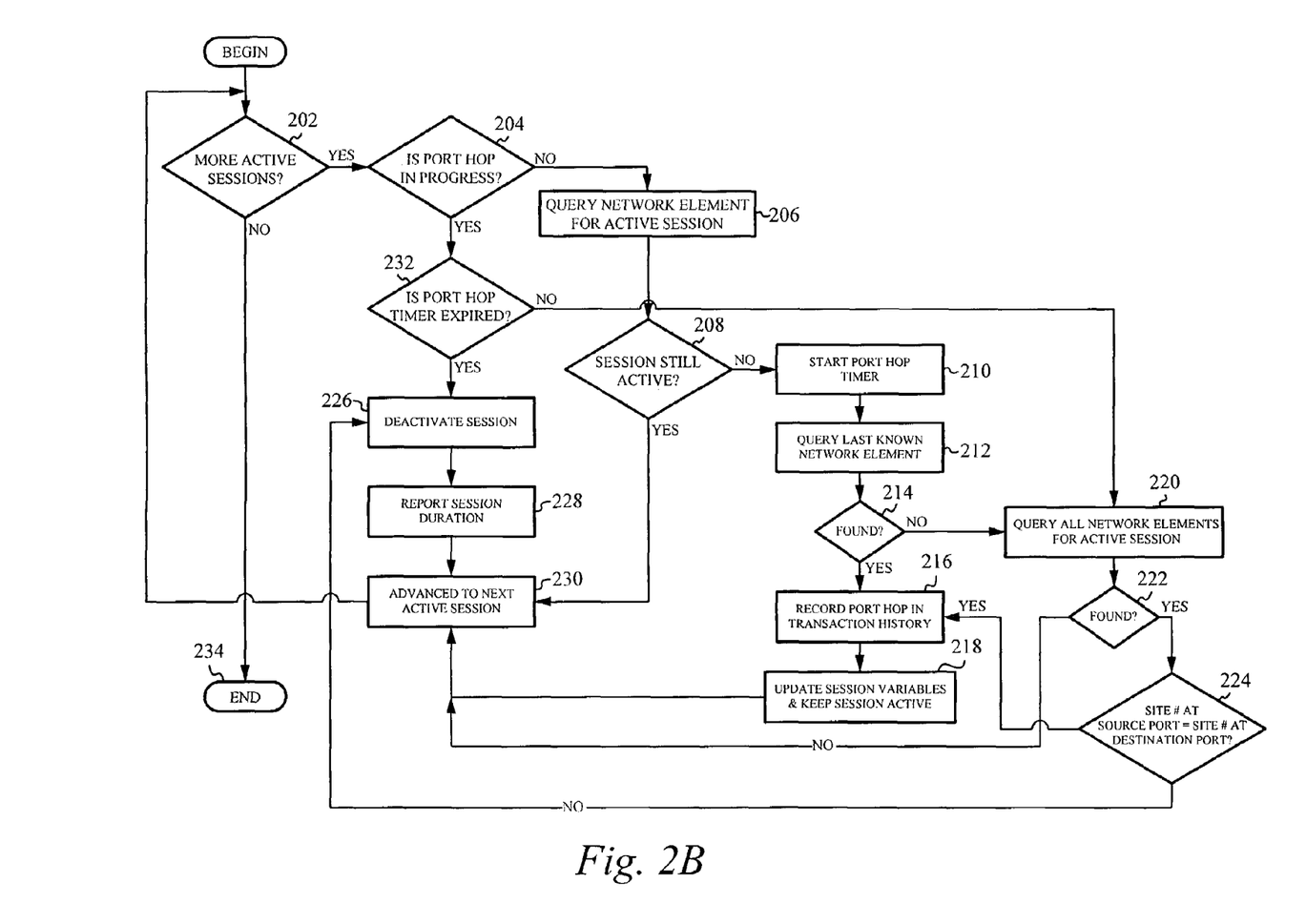
FIG. 2B is a flow diagram for a method for maintaining an active session for a user changing ports according to an alternative embodiment of the present invention.

In an alternative embodiment illustrated in FIG. 2B, if the user is identified on another port in block 222, the BBSM then verifies whether the user is port hopping between different sites in block 224. The BBSM does so by comparing the site number associated with the source port and the site number associated with the destination port in block 224. When the BBSM determines that the user is hopping ports between different sites, the BBSM deactivates the session in block 226 and reports the session duration in block 228. It may be possible for an end user to hop from the original site to another site and then back to the original site within the duration of the port hop delay. In this case, the BBSM deactivates the session even though the end user eventually hopped back to an allowed port. At the time the BBSM finds the end user on the disallowed port, the BBSM cannot know that the end user may hop back to the original site, and the BBSM may prevent inter-site port hopping in the alternative embodiment illustrated in FIG. 2B, so the BBSM deactivates the session.

Figure 3:
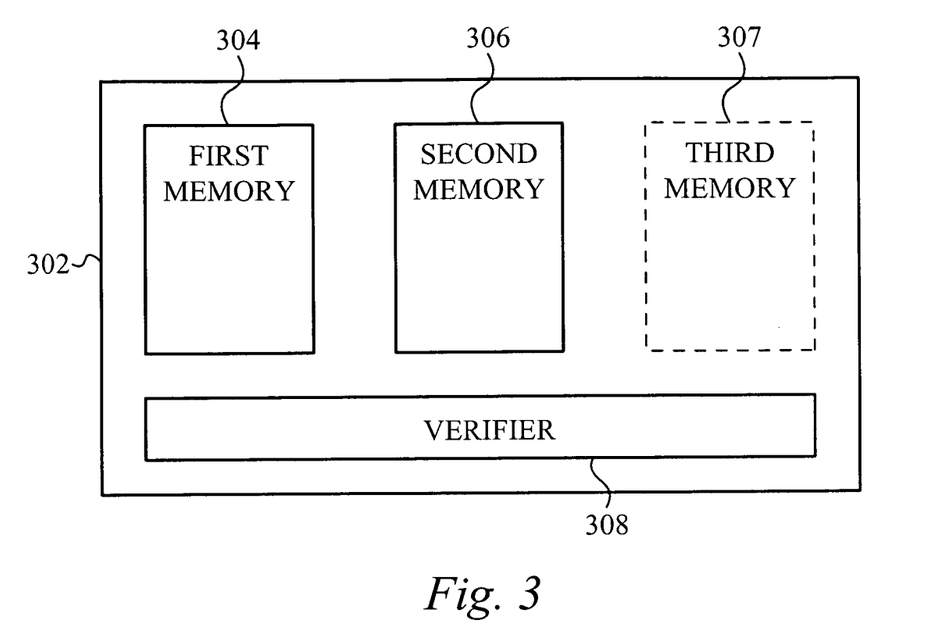
FIG. 3 is a block diagram of a device for maintaining an active session for a user changing ports according to a specific embodiment of the present invention.
Figure 10:
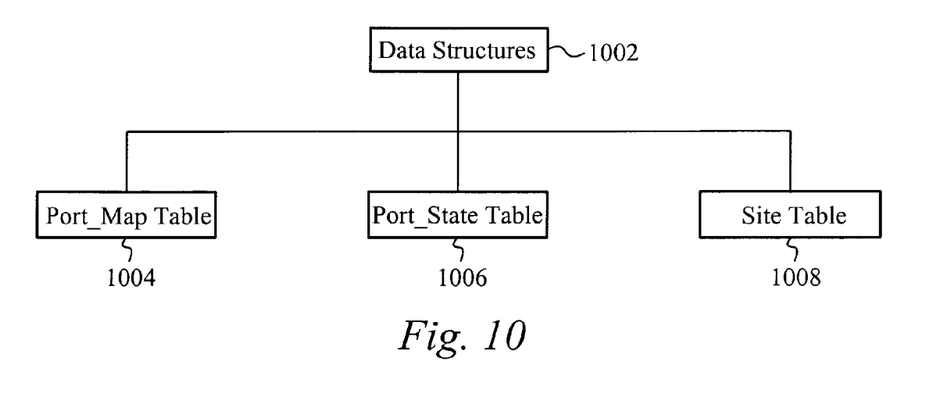
FIG. 10 is a block diagram of data structures for software for maintaining an active session for a user changing ports according to a specific embodiment of the present invention.

FIG. 3 illustrates a block diagram of a device for maintaining an active session for a user changing ports according to a specific embodiment of the present invention. A device 302, more particularly, a network connectivity device, comprises a first memory 304, a second memory 306, and a verifier 308. The first memory 304 stores a list of ports, for example, Port_Map Table 1004 as illustrated in FIG. 10. The second memory 306 stores a list of active sessions, for example, Port_State Table 1006 as illustrated in FIG. 10. Each active session identifies a port on which on a user is connected. In addition, each session comprises several variables such as the MAC address of the user, the IP address, and port policy. Other variables may also be included. An optional third memory 307 may store a list of sites, for example, Sites Table 1008 as illustrated in FIG. 10. The verifier 308 may be a software that communicates with the first memory 304, the second memory 306, and optionally the third memory 307. The verifier 308 periodically checks each active session in the list of active sessions provided by the second memory 306. If the port associated with a session indicates that the session is no longer active, the verifier 308 searches all other ports to determine a new location for the user. If the user is identified on another port (and the port hop is allowed), the verifier 308 updates the variables of the active session in the second memory 306 to record the new port location and to record the port hop event. In this case, the verifier 308 does not require the user to re-authenticate, making the port hop seamless for the user. If the verifier 308 does not find the user on the other ports, the verifier 308 repeats the search on the other ports until a configurable delay expires. In particular, the configurable delay may be an adjustable timer. At the expiration of such configurable delay, the verifier 308 deactivates the user's session and updates the second memory 306 to represent the session deactivation.

In addition to maintaining the current location of the session, the device 302 also records the port hop history of the user in a transaction log. By examining such transaction log, an administrator can track the mobility of the user. The device 302 also remembers the original location of the session throughout the life of the session. The original location of the session determines several policies applied to the session, and these policies follow the session for its lifetime. The verifier may also communicate with the third memory 307 to disallow the user to hop between different sites when such option is implemented.

Figure 4:
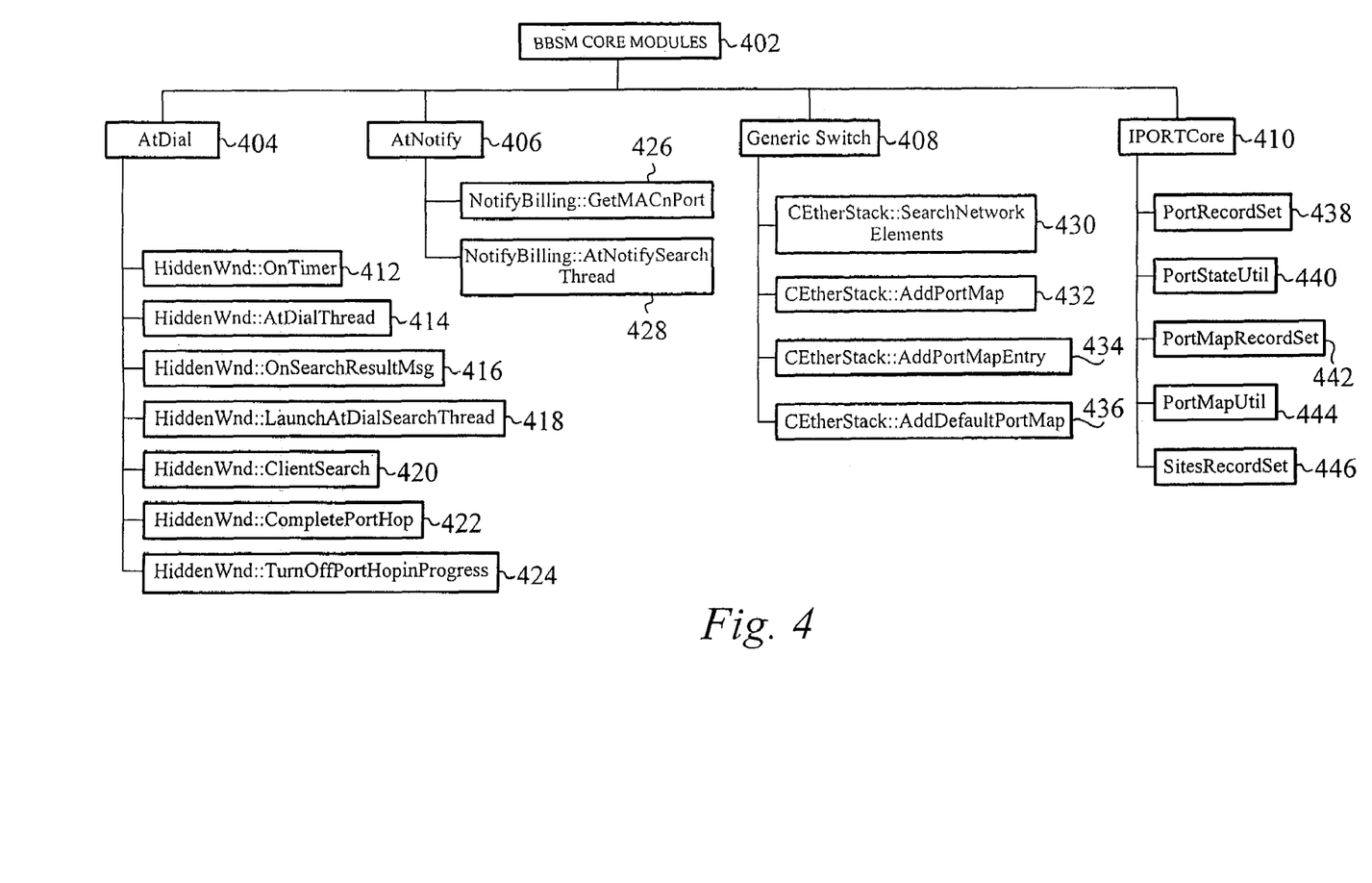
FIG. 4 is a block diagram of core modules of a software for maintaining an active session for a user changing ports according to a specific embodiment of the present invention.

FIG. 4 illustrates a block diagram of core modules of a software for maintaining an active session for a user changing ports according to a specific embodiment of the present invention. For illustration purposes, the following provides an example of an implementation of the present invention using several software modules. The BBSM Core modules 402 may comprise: AtDial modules 404, AtNotify modules 406, Generic Switch modules 408, and IPORT Core modules 410.

The AtDial modules 404 may comprise the following functions: HiddenWnd::OnTimer function 412, HiddenWnd::AtDialThread function 414, HiddenWnd::OnSearchResultMsg function 416, HiddenWnd::LaunchAtDialSearchThread function 418, HiddenWnd::ClientSearch function 420, HiddenWnd::CompletePortHop function 422, HiddenWnd::TurnOffPortHopInProgress function 424.

The HiddenWnd::OnTimer function 412 may run once per minute. The function performs many periodic tasks within BBSM, including a query of the network element associated with each active session to determine if the network element thinks the session is still active. Prior to the present invention, if the network element claimed that the session was no longer active, the OnTimer function deactivated the session. According to a specific embodiment of the present invention, this function performs the algorithm described in FIG. 2 allowing BBSM to maintain the session as it moves from network element port to network element port, providing mobility to the user.

The HiddenWnd::AtDialThread function 414 is part of the algorithm described in FIG. 2. This function performs a search, for example, an asynchronous search, of all network elements when the HiddenWnd::OnTimer function 412 determines that a session is no longer associated with its last known network element. The purpose of the search is to discover the network element port to which the session moved (if any). If it successfully finds the session on a network element port, this function posts a completion message to the main thread. Otherwise, this function posts a search failure message to the main thread.

The HiddenWnd::OnSearchResultMsg function 416, which is part of the main thread, processes the completion or search failure message from the HiddenWnd::AtDialThread function 414. If the message is a completion message, this function updates the appropriate state variables to record the new location (network element port) of the user. The exception to this case occurs if the session moves from site to site. Since the BBSM administratively may disallow an inter-site port hop, the function may deactivate the session in that case. If the message is a search failure message and the search time is expired, the function deactivates the session.

The HiddenWnd::LaunchAtDialSearchThread function 418 is called by the HiddenWnd::ClientSearch function 420 to launch the HiddenWnd::AtDialSearch thread function 418 in a separate thread of execution.

The HiddenWnd::ClientSearch function 420 is called by the HiddenWnd::OnTimer function 412 when the last known network element associated with a session reports that the session is no longer active. This function attempts to locate the client on a new network element.

The HiddenWnd::CompletePortHop function 422 updates the session state variables to record a successful port hop. This method invokes the HiddenWnd::TurnOffPortHopInProgress function 424 to perform additional clean up.

The HiddenWnd::TurnOffPortHopInProgress function 424 updates the port state table to indicate that the BBSM is not processing a port hop. Various functions invoke this function to indicate that a session is no longer in the transient port hop in progress state.

The AtNotify modules 404 may comprise the following functions: a NotifyBilling::GetMACnPort function 426 and a NotifyBilling::AtNotifySearchThread function 428.

The NotifyBilling::GetMACnPort function 426, which runs when a new user attempts to access the Internet, determines the MAC address and network element port (i.e., location) of the new user. This function establishes the initial network element and port that the BBSM will associate with the session. The HiddenWnd::OnTimer function 412 will query the network element established by this function periodically to determine if the end user moved to another network element port. This function may also invoke the NotifyBilling::AtNotifySearchThread function 428 to determine the network element port of the new user.

The NotifyBilling::AtNotifySearchThread function 428 performs a similar function to the HiddenWnd::AtDialThread function 414, but it runs only when a new user appears on the network, prior to session activation. This function establishes the initial location of the new user before the user activates the session.

The Generic Switch modules 408 may comprise the following: a CEtherStack::SearchNetworkElements function 430, a CEtherStack::AddPortMap function 432, a CEtherStack::AddPortMapEntry function 434, and a CEtherStack::AddDefaultPortMap function 436.

The CEtherStack::SearchNetworkElements function 430 performs a query of each network element from a set of network elements (typically all network elements associated with a given router, but sometimes only one network element) to determine which network element and port a session is using. Both the NotifyBilling::AtNotifySearchThread function 428 and the HiddenWnd::AtDialThread function 414 invoke this function to perform the low-level task of querying each network element in the set.

The CEtherStack::AddPortMap function 432, CEtherStack::AddPortMapEntry function 434, and CEtherStack::

AddDefaultPortMap function 436 may add a port hop flag to the Port_Map table 1004, which is also illustrated in FIG. 3 as the first memory 304.

The IPORT Core modules 410 may comprise the following: a PortRecordSet class 438, a PortStateUtil class 440, a PortMapRecordSet class 442, a PortMapUtil class 444, and a SitesRecordSet function 446.

The PortRecordSet class 438 and PortStateUtil class 440 provide access to the Port_State table 1006, which is also illustrated in FIG. 3 as the second memory 306. The PortMapRecordset class 442 and the PortMapUtil class 444, which together represent the first memory 304, are modified for the new EnablePortHop flag. The SitesRecordSet function 446 provides an additional column to the Sites table 1008, which is illustrated in FIG. 3 as the third memory 307, to regulate the duration of the port hop timer.

Figure 5:
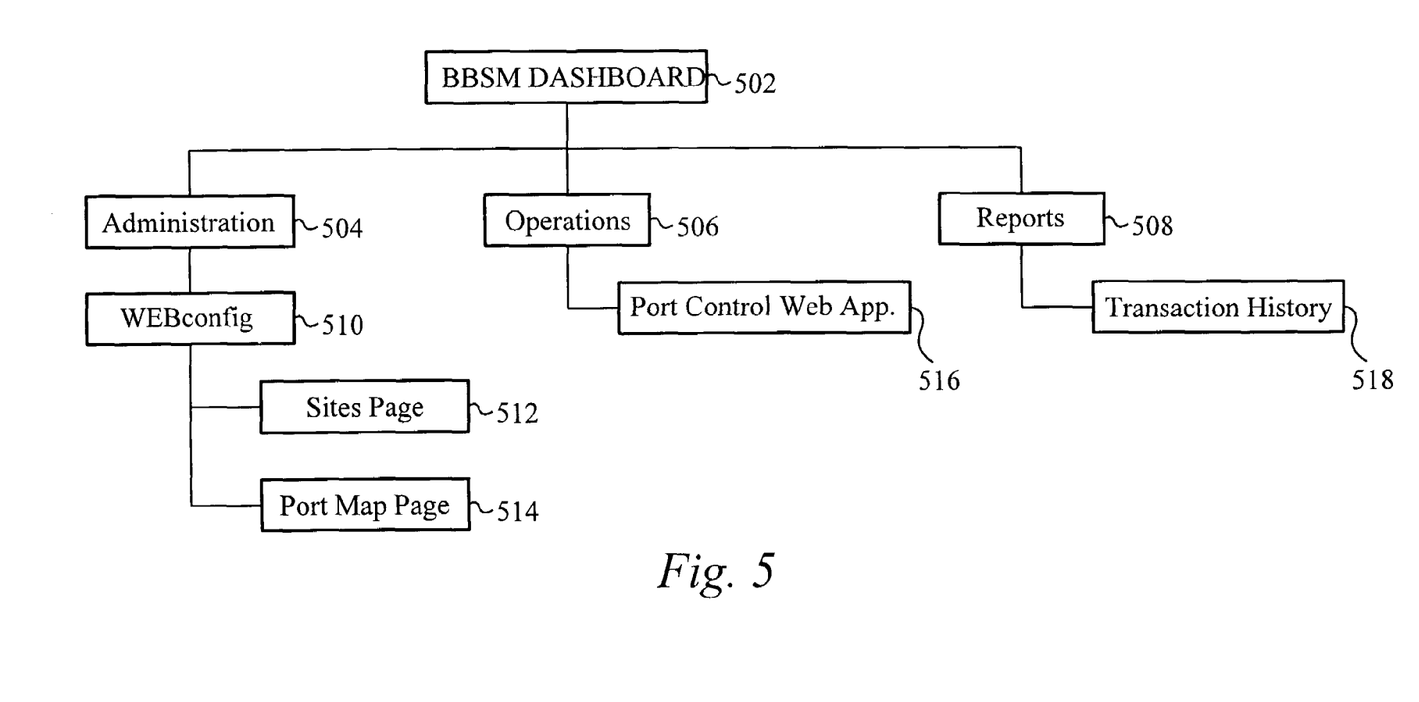
FIG. 5 is a block diagram of user interface components for a software for maintaining an active session for a user changing ports according to a specific embodiment of the present invention.

FIG. 5 is a block diagram of user interface components according to a specific embodiment of the present invention. The BBSM in FIG. 2 provides an administrator with an interface to monitor and control the sessions with a Dashboard application 502 as used for example in a Building Broadband Service Manager (BBSM). The Dashboard application 502 may comprise the following components: an Administration application 504, an Operations application 506, a Reports application 508.

Figure 6:
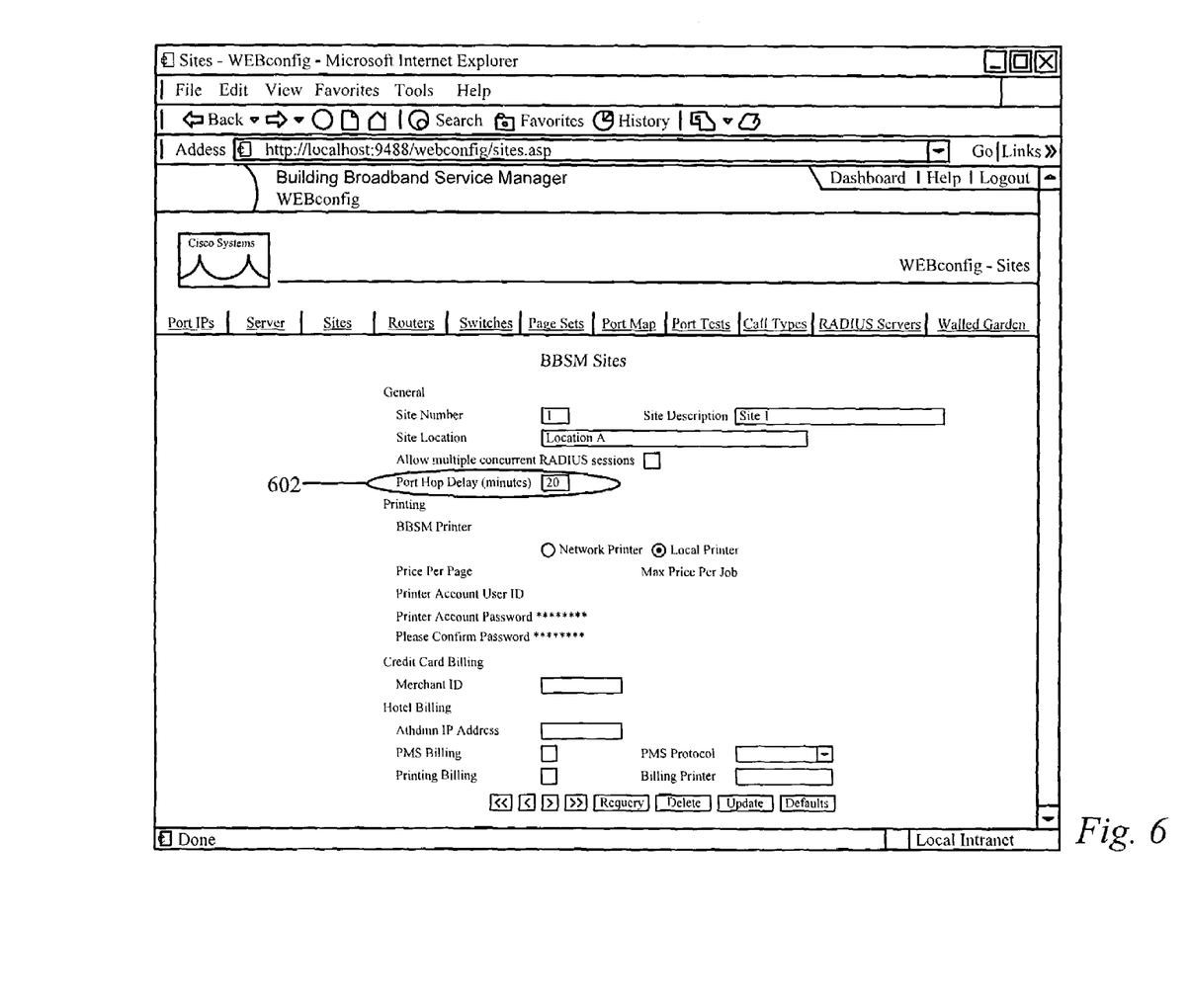
FIG. 6 is a screen shot illustrating a port hopping delay time setting according to a specific embodiment of the present invention.
Figure 7:
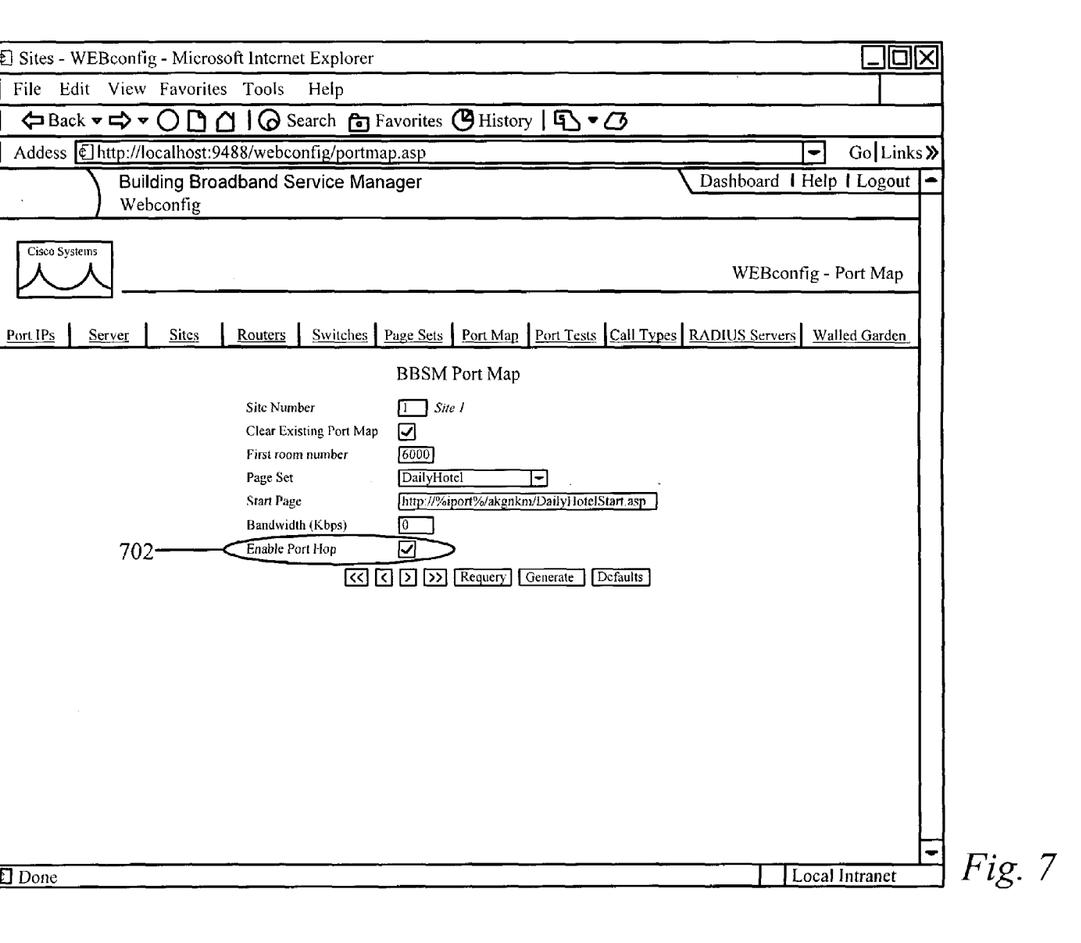
FIG. 7 is a screen shot illustrating a port hopping control setting for all ports according to a specific embodiment of the present invention.

In the administration application 504, an administrator may control the port hop parameters through a WEBconfig 510 page as illustrated in FIGS. 6 and 7. The WEBconfig may comprise a Sites page 512 and a Port Map page 514. The Sites page 512 may provide a text box 602 in FIG. 6 that allows an administrator to configure the port hop delay. The field will have a validation for values from 1 to 60 minutes with default of 20 minutes. The Port Map page 514 may provide a check box 702 in FIG. 7 that allows the administrator to enable or disable the port hop flag for all ports. The default value is disabled.

Figure 8:
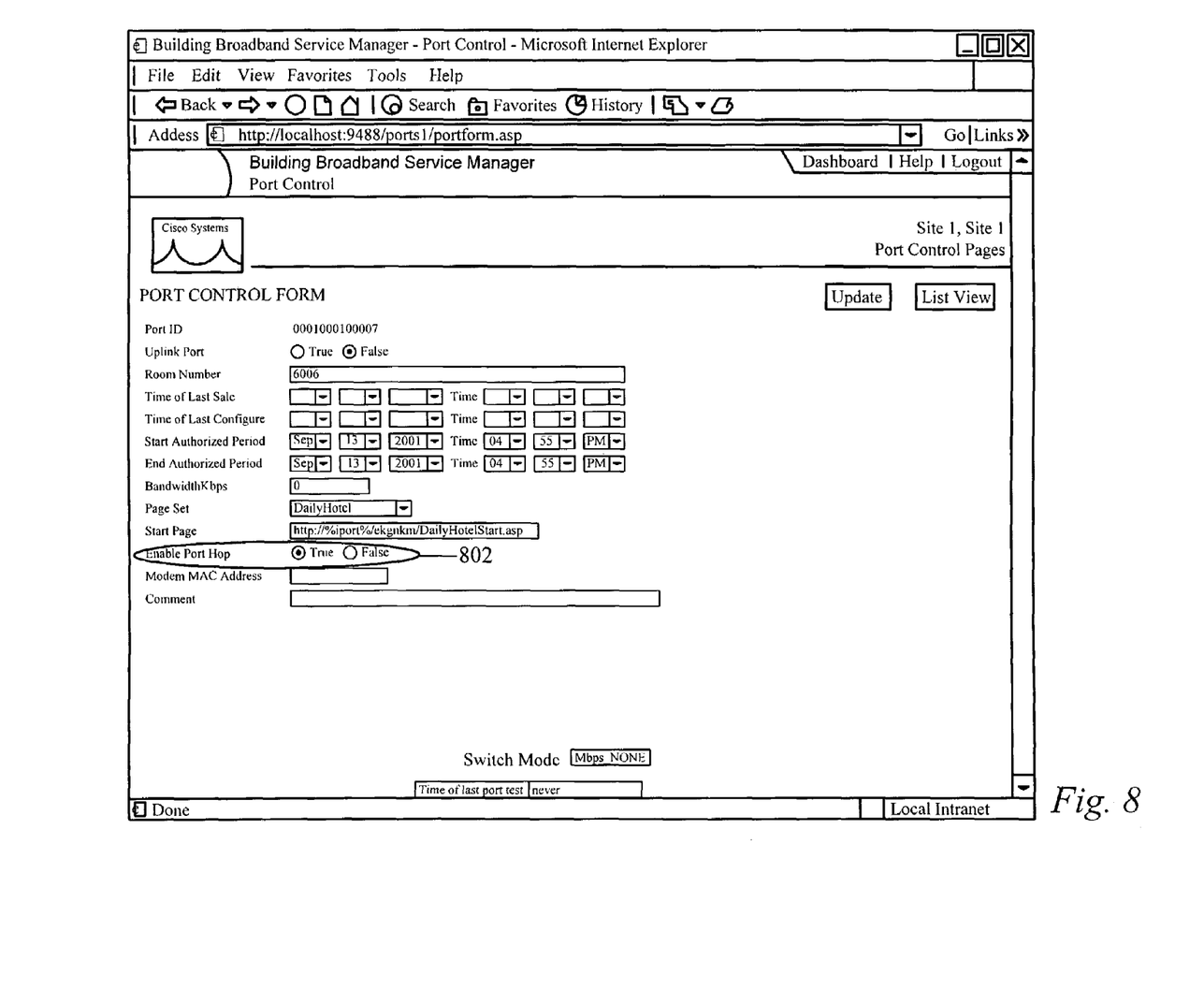
FIG. 8 is a screen shot illustrating a port hopping control setting for a specific port according to a specific embodiment of the present invention.

The operation application 506 may comprise a Port Control Web page 516 as illustrated in FIG. 8. The Port Control Web page 516 may comprise a check box 802 in FIG. 8 that allows the administrator to enable or disable the port hop flag for specific ports.

Figure 9:
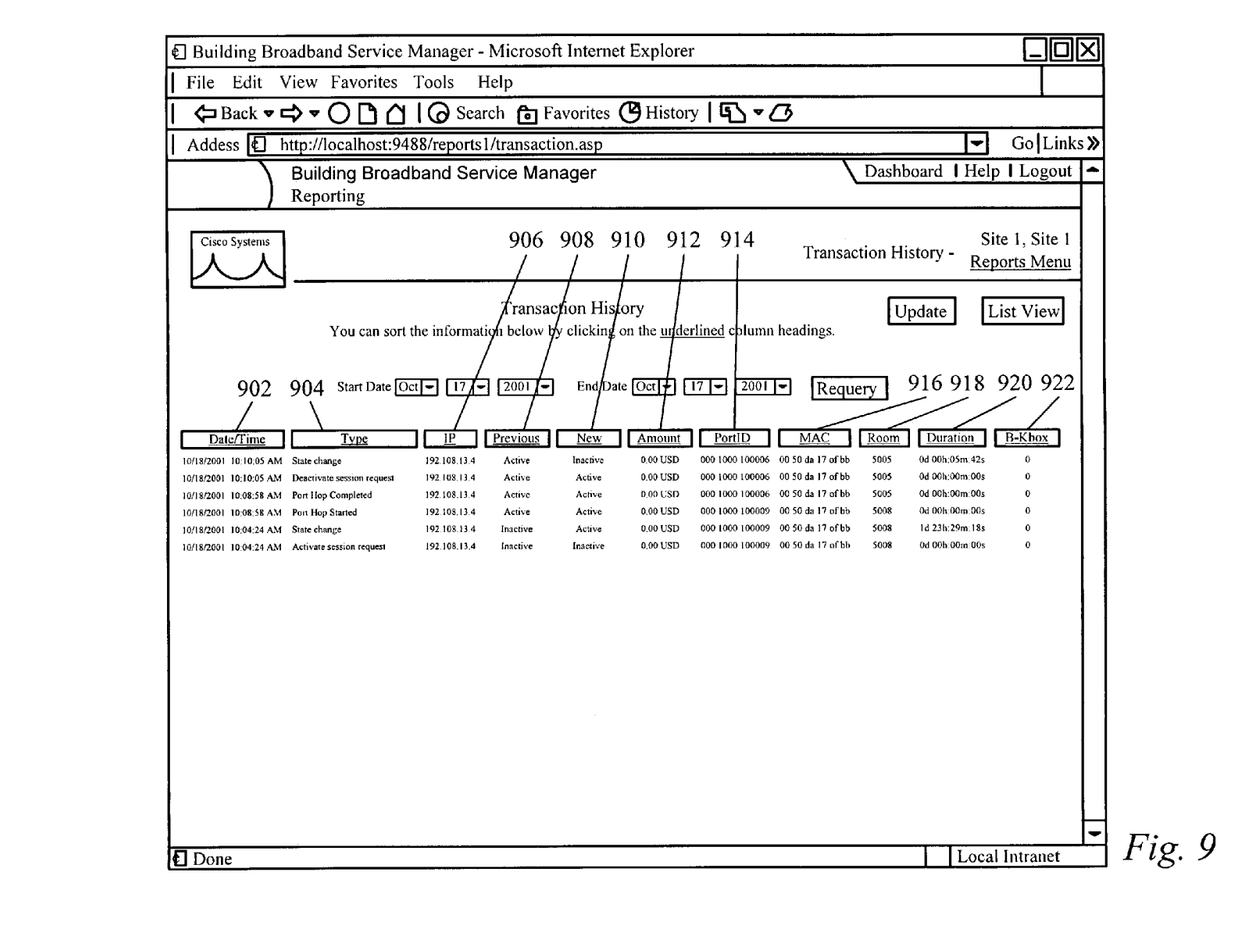
FIG. 9 is a screen shot illustrating a transaction history report of port hopping according to a specific embodiment of the present invention.

The Reports application 508 comprises a Transaction History table 518 as illustrated in FIG. 9. Each time a port hop event occurs, an entry is made into the Transaction History report 518. A Date/Time column 902 records the date and time at which the port hop completed. A Transaction type column 904 displays the type of port hop transaction that occurred. The possible types comprise port hop started, port hop completed, port hop failed—attempt to hop to another site, and port hop time expired—deactivating session. An IP column 906 records the IP address of the client who hopped. A Previous column 908 displays the previous state of the session as active or inactive. A New column 910 displays the new state of the session as active or inactive. The Amount column 912 displays the monetary amount of the port hop. Since the BBSM does not bill for the port hop, the transaction Amount column 912 remains at a zero value. A PortID column 914 records the destination port. If the user hops to the same port, this column has the same value as the source port. A MAC Address column 916 records the MAC address of the user who hopped. A Room column 918 records the room number associated with the destination port. A Duration column 920 records the duration of the session of a user at a port. A Bandwidth column 922 records the bandwidth limit (in kilobits per second) applied to the session. More columns may be included such as an Access Policy/Accounting Policy column (not shown) for recording the access policy and the accounting policy in use by the session. Since the policies follow the session from port to port, the value of these columns will be the same as the original policies recorded at session activation.

FIG. 10 illustrates an example of data structures for a software for maintaining an active session for a user changing ports according to a specific embodiment of the present invention. The data structures 1002 may comprise, for example, a Port_Map table 1004 stored in the first memory 304, a Port_State table 1006 stored in the second memory 306, and a Sites table 1008 stored in the third memory 307.

The Port_Map table 1004 may be modified to add an EnablePortHop column (not shown) for indicating whether a port is allowed to hop.

The Port_State table 1006 may be modified to add an OriginalPortID column (not shown), an OriginalRoom column (not shown), and a PortHopInProgress column (not shown). The OriginalPortID and the OriginalRoom columns are used to activate the session. The PortHopInProgress indicates whether a port hop is in progress. If the value is Null, there is no port hop in progress. Otherwise, the value is the time at which the client will be deactivated if the port hop is not completed.

The Sites table 1008 may be modified to add the number of minutes to elapse before deactivating the user.

Thus, when a session hops ports, there are two ports involved: the source port and the destination port. Each port stores a port hop flag in the Port_Map table 1004, indicating if the port, when acting as a source port, allows a session to hop from the port to port. When the administrator generates the port map page 514 using WEBconfig 510, the port hop flag is set for all ports. To individually enable or disable ports, the administrator will use the Port Control web application, accessible through the BBSM Dashboard 502 in the Port Control Web page 516.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A device comprising:
 a first memory configured to store a list of one or more ports;
 a second memory configured to store a list of one or more active sessions, each of said one or more active sessions identifying a port, a user identified on said port; and
 a verifier configured to communicate with said first memory and said second memory, said verifier further configured to periodically check a session in said list of one or more active sessions, said verifier further configured to search for said user in said list of one or more ports if said session is inactive, said verifier further configured to update said session if said user is identified on another port.

2. The device according to claim 1 wherein said verifier is further configured to deactivate said session if said user is not identified on any port.

3. The device according to claim 1 wherein said verifier is further configured to activate an adjustable timer when the user is not identified on said port, and to deactivate the active session for the user if the user is not identified on any port at the expiration of said adjustable timer.

4. The device according to claim 1 wherein said verifier is further configured to identify said user on any port with a Media Access Control address.

5. The device according to claim 1 wherein said verifier is further configured to update by associating the active session with the port on which user is identified.

6. The device according to claim 1 wherein said verifier is further configured to allow said search and said update when a port hopping setting is enabled, said search and said update disallowed when said port hopping setting is disabled.

7. The device according to claim 1 wherein the active session of the user at said other port is configured to retain a policy setting of the user at said port.

8. The device according to claim 1 wherein said verifier is further configured to search for said user on one or more network connectivity devices having one or more ports.

9. A method for maintaining an active session for a user changing ports, the method comprising:
periodically checking whether the user is identified on a port associated with the active session for the user;
searching for the user on other ports if the user is not identified on said port; and
updating the active session for the user if the user is identified on another port.

10. The method according to claim 9 further comprising:
deactivating the active session for the user if the user is not identified on any port.

11. The method according to claim 9 further comprising:
activating an adjustable timer when the user is not identified on said port; and
deactivating the active session for the user if the user is not identified on any port at the expiration of said adjustable timer.

12. The method according to claim 9 wherein the user is identified on any port with a Media Access Control address.

13. The method according to claim 9 wherein said updating further comprises associating the active session with the port on which the user is found.

14. The method according to claim 9 wherein said searching and said updating depend on the status of a port hopping setting, said searching and said updating allowed when said port hopping setting is enabled, said searching and said updating disallowed when said port hopping setting is disabled.

15. The method according to claim 9 wherein the active session of the user at said other port retains a policy setting of the user at said port.

16. The method according to claim 9 wherein said searching further comprises searching for the user on one or more network connectivity devices having one or more ports.

17. A device for maintaining an active session for a user changing ports, the device comprising:
means for periodically checking whether the user is identified on a port associated with the active session for the user;
means for searching for the user on other ports if the user is not identified on said port; and
means for updating the active session for the user if the user is identified on an other port.

18. The device according to claim 17 further comprising:
means for deactivating the active session for the user if the user is not identified on any port.

19. The device according to claim 17 further comprising:
means for activating an adjustable timer when the user is not identified on said port; and
means for deactivating the active session for the user if the user is not identified on any port at the expiration of said adjustable timer.

20. The device according to claim 17 wherein the user is identified on any port with a Media Access Control address.

21. The device according to claim 17 wherein said means for updating further comprises means for associating the active session with the port on which the user is found.

22. The device according to claim 17 wherein said means for searching and said means for updating depend on the status of a port hopping setting, said means for searching and said means for updating allowed when said port hopping setting is enabled, said means for searching and said means for updating disallowed when said port hopping setting is disabled.

23. The device according to claim 17 wherein the active session of the user at said other port retains a policy setting of the user at said port.

24. The device according to claim 17 wherein said means for searching further comprises means for searching for the user on one or more network connectivity devices having one or more ports.

25. A program storage device readable by a machine, tangibly embodying a program of instructions readable by the machine to perform a method for maintaining an active session for a user changing ports, the method comprising:
periodically checking whether the user is identified on a port associated with the active session for the user;
searching for the user on other ports if the user is not identified on said port; and
updating the active session for the user if the user is identified on an other port.

26. The program storage device according to claim 25 further comprising:
deactivating the active session for the user if the user is not identified on any port.

27. The program storage device according to claim 25 further comprising:
activating an adjustable timer when the user is not identified on said port; and
deactivating the active session for the user if the user is not identified on any port at the expiration of said adjustable timer.

28. The program storage device according to claim 25 wherein the user is identified on any port with a Media Access Control address.

29. The program storage device according to claim 25 wherein said updating further comprises associating the active session with the port on which the user is found.

30. The program storage device according to claim 25 wherein said searching and said updating depend on the status of a port hopping setting, said searching and said updating allowed when said port hopping setting is enabled, said searching and said updating disallowed when said port hopping setting is disabled.

31. The program storage device according to claim 25 wherein the active session of the user at said other port retains a policy setting of the user at said port.

32. The program storage device according to claim 25 wherein said searching further comprises searching for the user on one or more network connectivity devices having one or more ports.

* * * * *